United States Patent
Hughes et al.

(10) Patent No.: US 7,216,265 B2
(45) Date of Patent: May 8, 2007

(54) SOFTWARE INDEPENDENT WATCHDOGGING SCHEME FOR MONITORING OPERATING SYSTEM

(75) Inventors: James E. Hughes, Apex, NC (US); Eric R. Kern, Chapel Hill, NC (US); Thomas D. Pahel, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 10/868,648

(22) Filed: Jun. 15, 2004

(65) Prior Publication Data

US 2005/0278586 A1  Dec. 15, 2005

(51) Int. Cl.
*G06F 11/00* (2006.01)
(52) U.S. Cl. .......................... 714/55; 714/51
(58) Field of Classification Search .................. 714/51, 714/55
See application file for complete search history.

(56) References Cited

U.S. PATENT DOCUMENTS

| | | | |
|---|---|---|---|
| 6,065,139 A * | 5/2000 | Mehta et al. ................. | 714/55 |
| 6,112,320 A * | 8/2000 | Dien ............................ | 714/51 |
| 6,119,194 A | 9/2000 | Miranda et al. ............ | 710/129 |
| 6,205,505 B1 | 3/2001 | Jau et al. ..................... | 710/126 |
| 6,389,560 B1 | 5/2002 | Chew .......................... | 714/43 |
| 6,473,663 B2 | 10/2002 | Gulick ........................ | 700/94 |
| 6,505,298 B1 * | 1/2003 | Cerbini et al. ................ | 713/1 |
| 6,600,739 B1 | 7/2003 | Evans et al. ................ | 370/362 |
| 7,134,054 B2 * | 11/2006 | Oshima et al. ............... | 714/55 |

* cited by examiner

*Primary Examiner*—Maskulinski Michael
(74) *Attorney, Agent, or Firm*—Sawyer Law Group LLP

(57) ABSTRACT

An improved method and system for determining the state of an operating system includes an operating system, a USB host controller that is driven by the operating system to send a polling signal to a USB device, and a management module that monitors the polling signal. If the polling signal has stopped, then the management module takes corrective action to restore the operating system. No specialized software or specialized hardware is required to determine the state of the operating system. The state of the operating system can be determined quickly and efficiently without adding to the costs of the system.

19 Claims, 3 Drawing Sheets

SOFTWARE INDEPENDENT WATCHDOGGING SCHEME FOR MONITORING OPERATING SYSTEM

FIELD OF THE INVENTION

The present invention relates to a software monitoring scheme, and more particularly to the monitoring of a state of an operating system.

BACKGROUND OF THE INVENTION

Blade server systems are known in the art. FIG. 1 illustrates a conventional blade server. The blade server 101 comprises an operating system 103 and is managed by a management module 102. Occasionally, the blade server either stops functioning or is functioning improperly. In such a situation, it is often difficult to determine if the problem is with the operating system 103. Being able to quickly determine the state of the operating system 103 is important so that the operating system 103 can be re-initialized if it is the problem. If the operating system 103 is not the problem, then re-initializing it would be undesirable.

One conventional method for determining the state of the operating system 103 utilizes a driver 104 of the operating system 103 that periodically resets a watchdog circuitry 105 added to the blade server 101. If the watchdog circuitry times out without a reset, then this indicates that the operating system 103 has ceased to function properly. However, this solution requires specialized software (the driver 104) and specialized hardware (the watchdog circuitry 105), adding to the cost of the system.

Accordingly, there is a need for an improved method and system for determining the state of an operating system. The improved method and system should not require special hardware or software. The present invention addresses such a need.

SUMMARY OF THE INVENTION

An improved method and system for determining the state of an operating system includes an operating system, a USB host controller that is driven by the operating system to send a polling signal to a USB device, and a management module that monitors the polling signal. If the polling signal has stopped, then the management module takes corrective action to restore the operating system. No specialized software or specialized hardware is required to determine the state of the operating system. The state of the operating system can be determined quickly and efficiently without adding to the costs of the system.

DETAILED DESCRIPTION

The present invention provides an improved method and system for determining the state of the operating system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 and 3 in conjunction with the discussion below.

Figure 2:
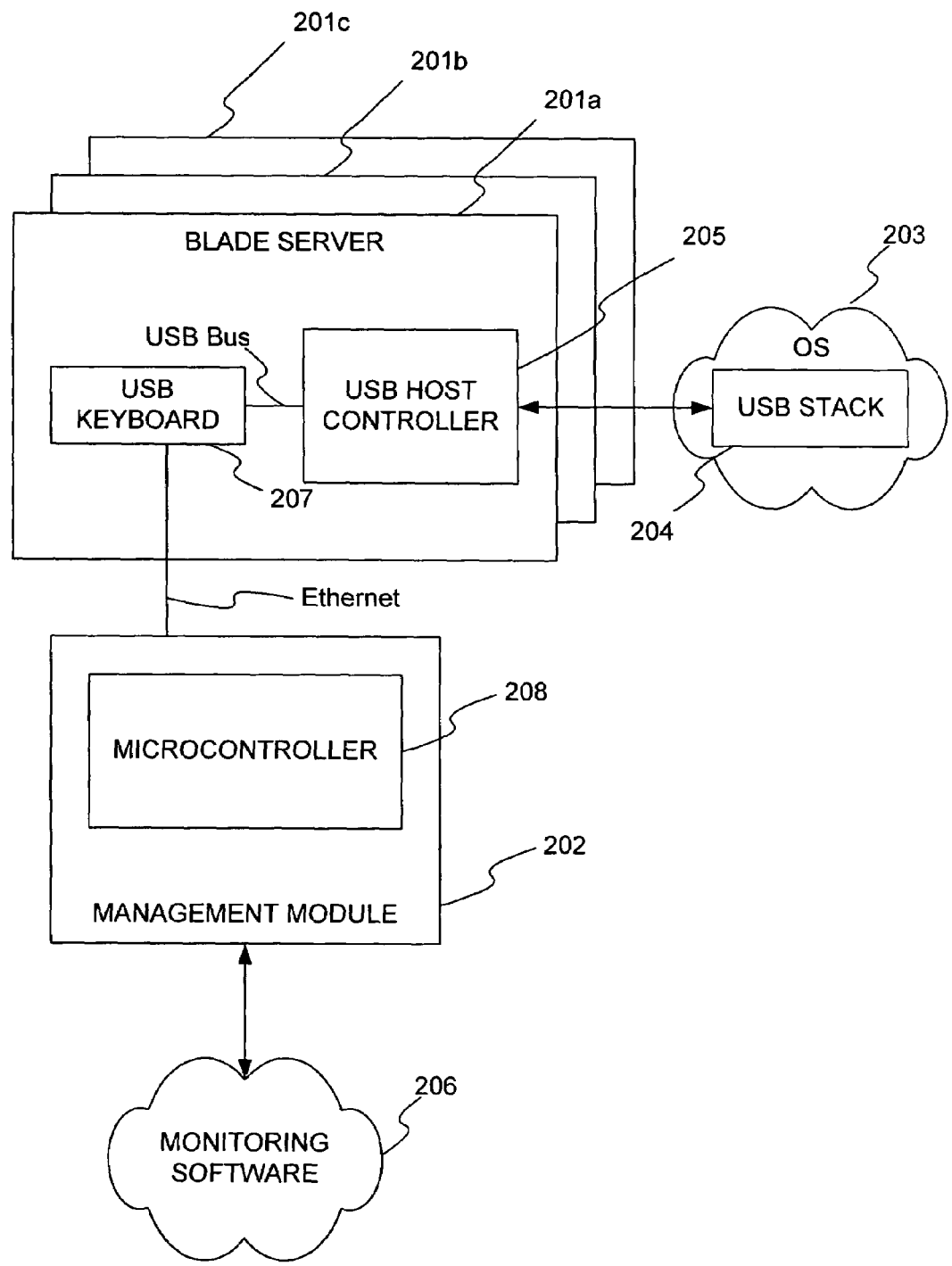
FIG. 2 illustrates a preferred embodiment of a system for determining the state of an operating system in accordance with the present invention.

FIG. 2 illustrates a preferred embodiment of a system for determining the state of an operating system in accordance with the present invention. The system comprises a blade center with a plurality of blade servers 201a–201c, each of which comprises a universal serial bus (USB) host controller 205. The USB host controller 205 provides an interface between a USB device 207, such as a USB keyboard, and the server 201a. The operating system 203 of the server 201a comprises a USB stack 204 which constantly polls the USB device 207 for data, via the USB host controller 205. The server 201a is managed by a management module 202. The management module 202 comprises a microcontroller 208 running a monitoring software 206 for monitoring USB traffic. When the microcontroller 208 receives data from a USB device 207, it passes the data to the USB host controller 205.

Figure 3:
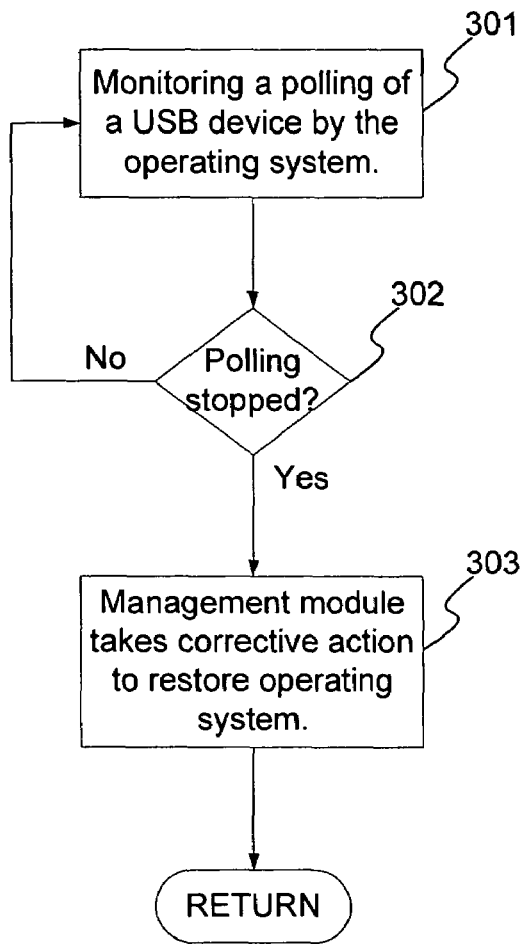
FIG. 3 is a flowchart illustrating a preferred embodiment of a method for determining the state of an operating system in accordance with the present invention.

FIG. 3 is a flowchart illustrating a preferred embodiment of a method for determining the state of an operating system in accordance with the present invention. Referring to both FIGS. 2 and 3, first, the polling of a USB device (206 or 207) by the operating system 203 is monitored, via step 301. In the preferred embodiment, the polling signal is driven by the USB stack 204 of the operating system 203, via the USB host controller 205, and is a part of the normal operation of the operating system 203. This polling signal is monitored by the management module 202. The monitoring continues as the polling continues, via step 302. If the polling ever stops, then the management module 202 knows that the operating system 203 has ceased to function properly, and can then take corrective action to restore the operating system 203, via step 303. Corrective action can include issuing alerts to a customer or a system administrator, or the running of diagnostic routines.

For example, the USB stack 204 drivers the USB host controller 205 to constantly poll for data from the USB keyboard 207. The microcontroller 208 of the management module 202 monitors the USB traffic, including the polling signal, via step 301. Assume then that a keystroke from a remote keyboard arrives at the server 201. The microcontroller 208 receives the keystroke and then sends the keystroke to the USB host controller 205. In sending the keystroke, the microcontroller 208 emulates a local keyboard, so that it appears to the USB host controller 205 that the keystroke is from a local USB device. The USB host controller 205 then sends the keystroke to the operating system 203, which processes the keystroke. However, assume then that the operating system 203 stops functioning properly and the system freezes. Since the operating system 203 is frozen, its USB stack 204 cannot keep driving the USB host controller 205 to poll the USB keyboard 207. Thus, the polling stops, via step 302. The microcontroller 208 determines that the polling has stopped, so it takes correction action to restore the operating system 203, via step 303.

Figure 1:
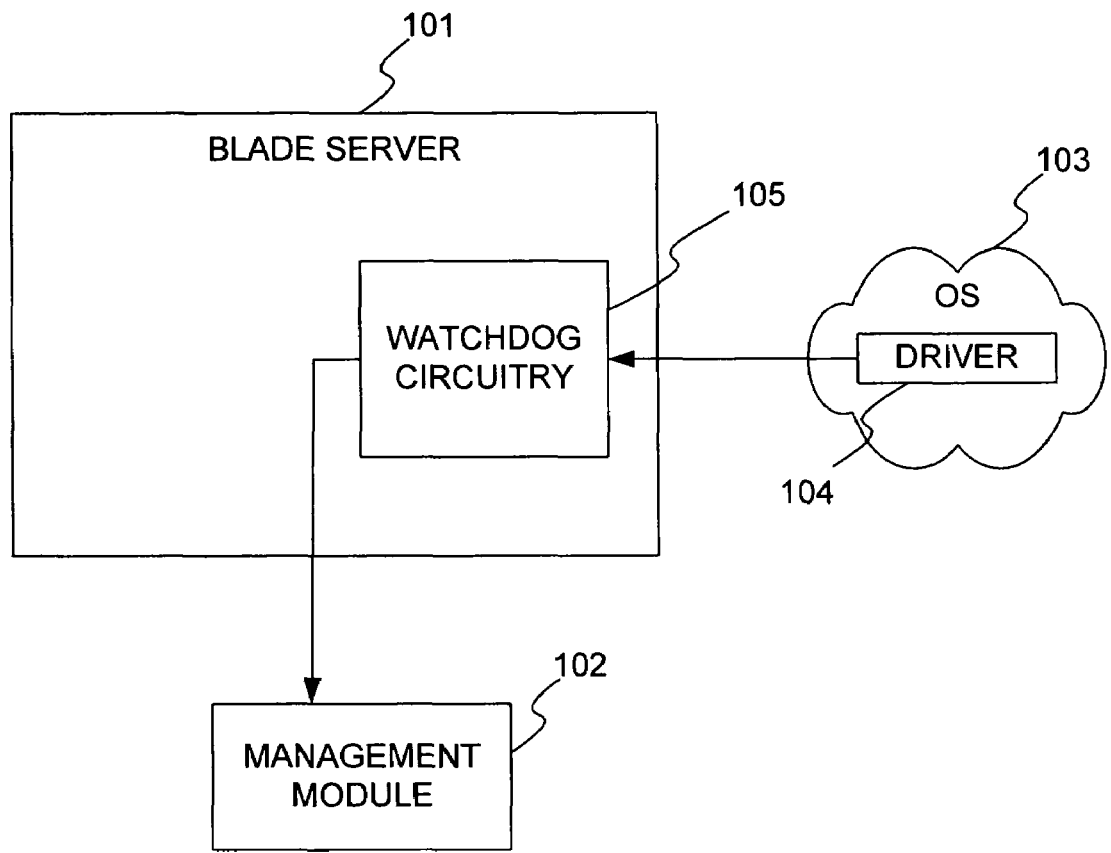
FIG. 1 illustrates a conventional blade server.

In this manner, no specialized software, such as the driver 104 (FIG. 1), nor specialized hardware, such as the watchdog circuitry 105, is required. The state of the operating system 203 can be determined quickly and efficiently without adding to the costs of the system.

Although the preferred embodiment is described above in the context of a blade server, one of ordinary skill in the art will understand that the present invention is applicable to other systems utilizing a universal serial bus without departing from the spirit and scope of the present invention.

An improved method and system for determining the state of an operating system has been disclosed. The method and system includes an operating system, a USB host controller that is driven by the operating system to send a polling signal to a USB device, and a management module that monitors the polling signal. If the polling signal has stopped, then the management module takes corrective action to restore the operating system. No specialized software or specialized hardware is required to determine the state of the operating system. The state of the operating system can be determined quickly and efficiently without adding to the costs of the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining a state of an operating system, comprising:
   (a) monitoring a polling of a universal serial bus (USB) device by the operating system;
   (b) determining if the polling has stopped; and
   (c) taking corrective action to restore the operating system, if the polling has stopped.

2. The method of claim 1, wherein the monitoring step (a) comprises:
   (a1) driving a universal serial bus (USB) host controller by the operating system to send a polling signal to the USB device; and
   (a2) monitoring the polling signal by a microcontroller.

3. The method of claim 2, wherein the monitoring step (a2) comprises:
   (a2i) monitoring the polling signal by the microcontroller of a management module for a blade server.

4. The method of claim 1, wherein the driving step (a1) comprises:
   (a1i) driving the universal serial bus (USB) host controller on a blade server by a USB stack of the operating system to send the polling signal to the USB device.

5. The method of claim 1, wherein the determining step (b) comprises:
   (b1) determining by a microcontroller if the polling signal has stopped.

6. The method of claim 5, wherein the determining step (b1) comprises:
   (b1i) determining by the microcontroller of a management module of a blade server if the polling signal has stopped.

7. The method of claim 1, wherein the corrective action comprises issuing an alert or running a diagnostic routine.

8. A system, comprising:
   an operating system;
   a USB host controller, wherein the USB host controller is driven by the operating system to send a polling signal to a USB device; and
   a management module, wherein the management module monitors the polling signal, wherein the management module takes corrective action to restore the operating system if the polling signal has stopped.

9. The system of claim 8, wherein the operating system comprises a universal serial bus (USB) stack, wherein the USB stack drives the USB host controller to send the polling signal.

10. The system of claim 9, wherein the universal serial bus host controller resides at a blade server.

11. The system of claim 8, wherein the management module comprises a microcontroller, wherein the microcontroller monitors the polling signal and takes corrective action to restore the operating system if the polling signal has stopped.

12. The system of claim 11, wherein the management module manages a blade server.

13. A computer readable medium with program instructions for determining a state of an operating system, comprising the instructions for:
   (a) monitoring a polling of a universal serial bus (USB) device by the operating system;
   (b) determining if the polling has stopped; and
   (c) taking corrective action to restore the operating system, if the polling has stopped.

14. The medium of claim 13, wherein the monitoring instruction (a) comprises:
   (a1) driving a universal serial bus (USB) host controller by the operating system to send a polling signal to the USB device; and
   (a2) monitoring the polling signal by a microcontroller.

15. The medium of claim 14, wherein the monitoring instruction (a2) comprises:
   (a2i) monitoring the polling signal by the microcontroller of a management module for a blade server.

16. The medium of claim 13, wherein the driving instruction (a1) comprises:
   (a1i) driving the universal serial bus (USB) host controller on a blade server by a USB stack of the operating system to send the polling signal to the USB device.

17. The medium of claim 13, wherein the determining instruction (b) comprises:
   (b1) determining by a microcontroller if the polling signal has stopped.

18. The medium of claim 17, wherein the determining instruction (b1) comprises:
   (b1i) determining by the microcontroller of a management module of a blade server if the polling signal has stopped.

19. The medium of claim 13, wherein the corrective action comprises issuing an alert or running a diagnostic routine.

* * * * *